(12) United States Patent
Ichinose et al.

(10) Patent No.: US 7,453,242 B2
(45) Date of Patent: Nov. 18, 2008

(54) POWER GENERATION APPARATUS USING AC ENERGIZATION SYNCHRONOUS GENERATOR AND METHOD OF CONTROLLING THE SAME

(75) Inventors: Masaya Ichinose, Hitachiota (JP);
Motoo Futami, Hitachiota (JP); Shinya Oohara, Hitachi (JP); Kazuhiro Imaie, Hitachi (JP); Mitsugu Matsutake, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/031,262

(22) Filed: Feb. 14, 2008

(65) Prior Publication Data

US 2008/0143113 A1 Jun. 19, 2008

Related U.S. Application Data

(63) Continuation of application No. 11/412,987, filed on Apr. 28, 2006, now Pat. No. 7,332,894.

(30) Foreign Application Priority Data

Jul. 27, 2005 (JP) ............... 2005-216649

(51) Int. Cl.
*H02P 9/44* (2006.01)
(52) U.S. Cl. ............... 322/29; 322/45; 290/44
(58) Field of Classification Search ............ 322/20, 322/22, 27, 28, 29, 45; 290/44
See application file for complete search history.

(56) References Cited

U.S. PATENT DOCUMENTS

| | | | |
|---|---|---|---|
| 3,675,117 A | 7/1972 | Reimers | |
| 4,463,306 A | 7/1984 | de Mello et al. | |
| 4,855,664 A | 8/1989 | Lane | |
| 5,083,039 A * | 1/1992 | Richardson et al. | 290/44 |
| 5,225,712 A * | 7/1993 | Erdman | 290/44 |
| 5,390,068 A | 2/1995 | Schultz et al. | |
| 5,587,647 A | 12/1996 | Bansal et al. | |
| 5,798,631 A * | 8/1998 | Spee et al. | 322/25 |
| 5,880,533 A * | 3/1999 | Arai et al. | 290/31 |
| 6,323,624 B1 | 11/2001 | Henriksen | |
| 6,856,038 B2 | 2/2005 | Rebsdorf et al. | |
| 6,882,060 B2 * | 4/2005 | Matsuo et al. | 290/52 |
| 7,015,595 B2 * | 3/2006 | Feddersen et al. | 290/44 |
| 7,173,399 B2 | 2/2007 | Sihler et al. | |
| 7,332,894 B2 * | 2/2008 | Ichinose et al. | 322/29 |

FOREIGN PATENT DOCUMENTS

JP 2000-308398 2/2000

OTHER PUBLICATIONS

US 7,355,295, 04/2008, Rivas et al. (withdrawn)*

* cited by examiner

*Primary Examiner*—Nicholas Ponomarenko
(74) *Attorney, Agent, or Firm*—Antonelli, Terry, Stout & Kraus, LLP.

(57) ABSTRACT

A power generation apparatus and method includes an AC energization synchronous generator, a switching device for connecting to a network disposed on a stator side of the AC energization synchronous generator, an energizing device for applying a variable frequency AC to a secondary winding of the AC energization synchronous generator, and a first voltage detection unit for detecting a voltage of the switching device on the stator side. A rotational frequency of the AC energization synchronous generator is estimated or calculated based on a frequency of a stator side voltage of the switching device, while the switching device is open.

9 Claims, 6 Drawing Sheets

POWER GENERATION APPARATUS USING AC ENERGIZATION SYNCHRONOUS GENERATOR AND METHOD OF CONTROLLING THE SAME

CROSS REFERENCE TO RELATED APPLICATION

This application is a continuation application of U.S. application Ser. No. 11/412,987, filed Apr. 28, 2006, now U.S. Pat. No. 7,322,894 the contents of which are incorporated herein by reference.

BACKGROUND OF THE INVENTION

The present invention relates to a wind power generation apparatus using an AC energization synchronous generator connected to a power network, and more particularly to a power generation apparatus having a generator without a rotor position sensor.

In an AC energization synchronous generator for example a doubly-fed generator or a wound-rotor induction generator, used for a wind power generation apparatus, as a rotor winding of a power converter is excited at a slip frequency, a stator side can output an AC voltage having the same frequency as that of a network frequency, a rotation speed can be made variable, and a capacity of the power converter can be reduced.

In a system using an AC energization synchronous generator, a power converter capacity is often smaller than a generator capacity. In such a case, it is necessary to operate the generator synchronously with a network when the generator rotation speed enters a predetermined range. From this reason, a wind power generation apparatus is frequently stopped and operated under the influence of strong and weak wind.

Activation of a wind power generation system using an AC energization synchronous generator starts in a state that a switch connecting a generator stator and a network is open. First, a wind turbine starts rotating by wind. Next, a wind turbine control apparatus instructs a voltage synchronous operation of synchronizing the voltage amplitudes and phases of both the generator stator and the network. At this time, an excitation apparatus excites a rotor winding at a difference frequency (slip frequency) between a network frequency and a rotor frequency calculated by a rotor rotation speed detector. Therefore, the stator can generate a frequency almost coincident with the network frequency at the energization initial stage. When synchronization of the amplitudes and phases of the stator and a network voltage is completed, the switch is closed to electrically connect the generator and network to feed power from the generator to the network.

JP-A-2000-308398 (FIG. 1, description of paragraphs [0027] to [0035]) discloses the operation of synchronizing and the operation of connecting to the network for a variable speed pumped storage power generation apparatus equipped with an AC energization synchronous generator.

SUMMARY OF THE INVENTION

According to the above-described conventional techniques, if the AC energization synchronous generator is not equipped with a rotor position/rotation speed sensor, a slip frequency, i.e., a difference between a network frequency and a rotor frequency, cannot be calculated in the operation of synchronizing to the network, and the generator cannot connect to the network.

An object of the present invention is to provide a power generation apparatus capable of connecting to the network in a short time of an AC energization synchronous generator not equipped with a rotor position/rotation speed sensor.

According to the present invention, when excitation of a secondary winding starts to conduct synchronous incorporation of an AC energization synchronous generator to a network voltage, excitation of the secondary winding a fixed frequency and a slip frequency is calculated from a difference between a frequency of the network voltage and a resultant stator voltage frequency different from the network frequency. Thereafter, the frequency of excitation changes to the slip frequency and a voltage having a frequency generally coincident with the network frequency is output to the stator, and the phase is adjusted to make zero a phase difference when the rotation speed changes or the phases become different.

In a wind power generation apparatus of the present invention, connecting to the network of an AC energization synchronous generator to a network voltage is possible without a rotor position sensor.

Other objects, features and advantages of the invention will become apparent from the following description of the embodiments of the invention taken in conjunction with the accompanying drawings.

DESCRIPTION OF THE EMBODIMENT

An object of connecting to the network in a short time of an AC energization synchronous generator to a network can be realized by a minimum number of sensors and a simple control method. The details of the present invention will be described with reference to the accompanying drawings.

Figure 1:
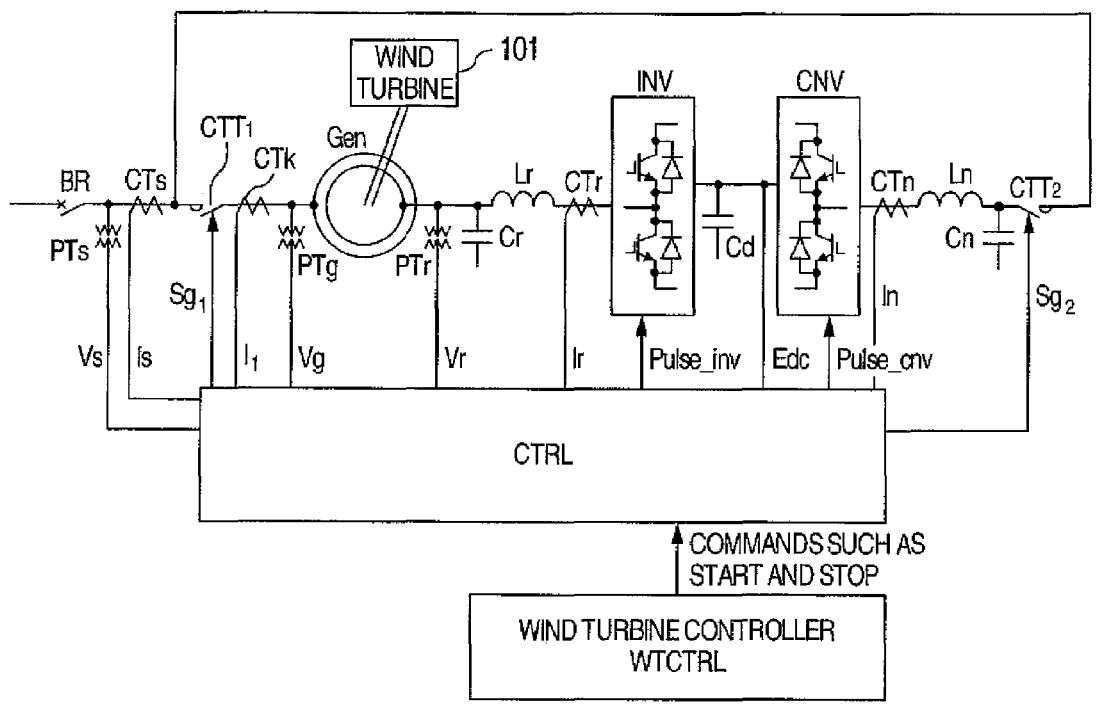
FIG. 1 is an illustrative diagram showing a circuit structure of a wind power generation apparatus according to a first embodiment of the present invention.

FIG. 1 an one-line wiring diagram showing the structure of an apparatus of the embodiment. First, description will be made on electric wirings and an apparatus for outputting a generated power. A generator Gen is a secondary energization type generator (AC energization synchronous generator). A rotor of the generator Gen is coupled to a wind turbine 101 for wind power generation via gears or the like, and rotated by wind power. A three-phase AC output on the stator side of the generator Gen is connected to a secondary side of, for example, an electromagnetic contact switch $CTT_2$ capable of being opened and closed by an external signal $Sg_1$. The primary side of the electromagnetic contact switch $CTT_1$ is connected to the primary side of an electromagnetic contact switch $CTT_2$ and to a breaker BR. The primary side of the breaker BR is connected to a power network. The breaker BR has a function of, e.g., opening the breaker upon excessive current to shut off current. As the breaker BR is closed, a power is supplied to a control apparatus of the wind power generation apparatus.

The secondary side of the electromagnetic contact switch $CTT_2$ is connected to an AC output terminal of a power converter CNV via a delta-connected capacitor Cn and reactor Ln. A DC output terminal of the power converter CNV is connected to a DC output terminal of a power invertor INV via a DC smoothing capacitor Cd. For example, the power converters CNV and INV are made of power semiconductor switching elements (such as thyristor, GTO, IGBT and MOS-FET), and convert DC current into AC current and AC current into DC current, respectively. An AC output terminal of the power invertor INV is connected to the secondary winding terminal of the generator Gen via a reactor Lr and a capacitor Cr.

Next, description will be made on wirings and apparatus for controlling power generation. Three-phase voltage and three-phase current on the secondary side of the breaker BR are converted into low voltage signals Vs and Is by a voltage sensor PTs and a current sensor CTs, respectively, to be input to the control apparatus CTRL. Voltage and current on the secondary side of the electromagnetic contact switch $CTT_1$, i.e., along a path between the electromagnetic contact switch $CTT_1$ and generator stator are converted into low voltage signals Vg and $I_1$ by a voltage sensor PTg and a current sensor CTk, respectively, to be input to the control apparatus CTRL. Three-phase current on the secondary side of the electromagnetic contact switch $CTT_2$, i.e., along a path between the electromagnetic contact switch $CTT_2$ and power converter CNV is converted into a low voltage signal In by a current sensor CTn, to be input to the control apparatus CTRL. Voltage of the smoothing capacitor Cd connected to a path between the power converter CNV and the DC portion of the power invertor INV is converted into a voltage signal Edc, to be input to the power control apparatus CTRL. A wind turbine controller WTCTRL has a function of sending various command values such as start and stop to the control apparatus CTRL and detecting a status value of the wind turbine.

Next, the function of the control apparatus CTRL will be described with reference to FIGS. 2 and 3. The control apparatus CTRL controls the electromagnetic contact switches $CTT_1$ and $CTT_2$ by using the signals $Sg_1$ and $Sg_2$. The control apparatus CTRL outputs pulse signals Pulse_inv and Pulse_cnv for controlling and driving the power converters INV and CNV having power semiconductor switching elements.

The power converter CNV controls a DC voltage Edc of the smoothing capacitor Cd to maintain constant, before the generator Gen is connected to the power network via the electromagnetic contact switch $CTT_1$, i.e., during activation of the wind power generation apparatus. To this end, the power converter CNV performs DC voltage control and network reactive power zero (power factor of 1) control. As the power converter INV consumes energy of the smoothing capacitor Cd and the DC voltage lowers, the DC voltage control by the power converter CNV charges the smoothing capacitor Cd by using AC power and maintains the DC voltage Edc constant. Conversely, as the power converter INV charges the smoothing capacitor Cd and the DC voltage Edc rises, the DC voltage control by the power converter CNV converts DC power into AC power to discharge and maintain the DC voltage Edc constant.

A control operation by the power converter CNV will be described with reference to FIG. 2. The detected AC voltage Vs is input to a phase detector THDET and a three-phase to two-phase converter 32trs. The phase detector THDET calculates a phase signal THs following a network voltage, for example, by a phase locked loop (PLL) method, and outputs the phase signal THs to a three-phase to two-phase coordinate converter 32dqtrs and a two-phase to three-phase coordinate converter dq23trs. A DC voltage command value Eref and a DC voltage detection value Edc are input to a DC voltage adjustor DCAVR (for example, a proportional integration controller). The DC voltage adjustor DCAVR adjusts an output d-axis current command value (active current command value) Idnstr so as to make zero a difference between the input command value Eref and detection value Edc, and outputs the command value Idnstr to a current adjustor 1-ACR.

The three-phase to two-phase coordinate converter 32dqtrs calculates, from a signal In input from the current sensor CTn, a d-axis current detection value Idn (active current) and a q-axis current detection value Iqn (reactive current) by using a conversion equation (1), and outputs the d-axis current detection value Idn to the current adjuster 1-ACR and the q-axis current detection value Iqn to a current adjustor 2-ACR.

$$\begin{pmatrix} Idn \\ Iqn \end{pmatrix} = \frac{2}{3} \begin{pmatrix} \cos(THs) & \sin(THs) \\ -\sin(THs) & \cos(THs) \end{pmatrix} \qquad (1)$$

$$\begin{pmatrix} Iu \cdot \cos(0) + Iv \cdot \cos(2\pi/3) + Iw \cdot \cos(4\pi/3) \\ Iu \cdot \sin(0) + Iv \cdot \sin(2\pi/3) + Iw \cdot \sin(4\pi/3) \end{pmatrix}$$

The current adjustor 1-ACR adjusts a d-axis voltage command value $Vdn_0$ so as to make zero a difference between the d-axis current command value Idnstr and d-axis current detection value Idn, and outputs the command value $Vdn_0$ to an adder 301. Similarly, the current adjustor 2-ACR adjusts a q-axis voltage command value $Vqn_0$ so as to make zero a difference between the q-axis current command value (=0) and the q-axis current detection value Iqn, and outputs the command value $Vqn_0$ to an adder 302. For example, the current adjustors 1-ACR and 2-ACR may be constituted of a proportional integration controller.

The three-phase to two-phase converter 32trs calculates, from a signal Vs input from the voltage sensor PTs, α components Vsα and β components Vsβ by using a conversion equation (2), calculates a d-axis voltage detection value (phase components coincident with a network voltage vector) Vds and a q-axis voltage detection value (components orthogonal to the d-axis voltage detection value Vds) Vqs by using a conversion equation (3), and outputs the detection values to the adders 301 and 302, respectively.

$$\begin{pmatrix} Vs\alpha \\ Vs\beta \end{pmatrix} = \frac{2}{3} \begin{pmatrix} \cos(0) & \cos(2\pi/3) & \cos(4\pi/3) \\ \sin(0) & \sin(2\pi/3) & \sin(4\pi/3) \end{pmatrix} \begin{pmatrix} Vsu \\ Vsv \\ Vsw \end{pmatrix} \qquad (2)$$

$$\begin{pmatrix} Vds \\ Vqs \end{pmatrix} = \begin{pmatrix} \cos(THs) & \sin(THs) \\ -\sin(THs) & \cos(THs) \end{pmatrix} \begin{pmatrix} Vs\alpha \\ Vs\beta \end{pmatrix} \qquad (3)$$

The adder 301 adds the d-axis voltage command value $Vdn_0$ and the d-axis voltage detection value Vds and outputs the addition result to the two-phase to three-phase coordinate converter dq23trs. Similarly, the adder 302 adds the q-axis voltage command value $Vqn_0$ and the q-axis voltage detection value Vqs and outputs the addition result to the two-phase to three-phase coordinate converter dq23trs. The two-phase to three-phase coordinate converter dq23trs calculates, from the input phase signal THs and addition results Vdn and Vqn, voltage command values Vun, Vvn and Vwn by using conversion equations (4) and (5), and outputs the command values to a PWM calculator PWMn.

$$\begin{pmatrix} Va \\ Vb \end{pmatrix} = \begin{pmatrix} \cos(THs) & -\sin(THs) \\ \sin(THs) & \cos(THs) \end{pmatrix} \begin{pmatrix} Vdn \\ Vqn \end{pmatrix} \quad (4)$$

$$\begin{pmatrix} Vun \\ Vvn \\ Vwn \end{pmatrix} = \begin{pmatrix} \cos(0) & \sin(0) \\ \cos(2\pi/3) & \sin(2\pi/3) \\ \cos(4\pi/3) & \sin(4\pi/3) \end{pmatrix} \begin{pmatrix} Va \\ Vb \end{pmatrix} \quad (5)$$

The PWM calculator PWMn calculates, from the input voltage command values Vun, Vvn and Vwn, a gate signal Pulse_cnv for turning on and off n power semiconductor elements constituting the power converter CNV by a pulse width modulation (PWM) method, and outputs the gate signal to the power converter CNV.

Next, a control operation by the power converter INV will be described with reference to FIG. 2. A power calculator PQCAL receives a d-axis current Ids having the same direction as that of a U-phase vector of the network voltage and detected through conversion by the equation (1) of the signal Is output from the current sensor CTs for sensing a network current, a q-axis current Iqs orthogonal to the U-phase vector of the network voltage, the d-axis voltage detection value Vds and a q-axis voltage detection value Vqs, and calculates a network active power Ps and reactive power Qs by using equations (6).

$$Ps=3(Vds \times Ids + Vqs \times IqS)$$

$$Qs=3(-Vds \times Iqs + Vqs \times Ids) \quad (6)$$

An active power adjustor APR receives an active power value Ps and an output power command value Pref of the wind power generation apparatus, and outputs an active current command value $Iq_0$ which makes zero a difference between the output power command value Pref and active power value Ps. Although the active power command value Pref is used by way of example, a torque command value may be used. In this case, the torque command value is multiplied by a rotation speed of the generator to obtain an active power command value.

A reactive power adjustor AQR receives the reactive power value Qs and the output voltage command value Qref of the wind power generation apparatus, and outputs an energization current command value $Id_0$ for making zero a difference between the output power command value Qref and the reactive power value Qs. For example, the active power adjustor APR and reactive power adjuster AQR may be constituted of a proportional integrator.

The active current command value $Iq_0$ and energization current command value $Id_0$ output from the active power adjustor APR and reactive power adjustor AQR are input to a switch SW. The switch SW determines whether the outputs from the active power adjustor APR and reactive power adjustor AQR are used or whether the torque command value of 0 is used or the output of a voltage adjustor is used as an energization current command value. Before the electromagnetic contact switch $CTT_1$ is connected, i.e., during a voltage synchronous operation with the generator stator voltage being made synchronous with the network voltage, the switch SW uses the latter, i.e., zero as the torque command value and an output of the voltage adjustor as the energization command value. After the electromagnetic contact switch $CTT_1$ is connected, the switch uses the former, i.e., the outputs of the power adjustors.

Next, the voltage adjustor AVR will be described with reference to FIG. 3. The voltage adjustor AVR uses an amplitude value Vgpk of the generator stator voltage Vg as a feedback value, receives a command value Vsref which is an amplitude value of the signal Vs output from the voltage sensor PTs for detecting the network voltage and passed through a filter FIL, and outputs the energization current command value $Id_1$ for making zero a difference between the amplitude value of the generator stator voltage Vg and the command value Vsref, to the switch SW. For example, the voltage adjustor AVR may be constituted of a proportional integration controller. The voltage adjustor AVR operates in the state that the electromagnetic contact switch $CTT_1$ is opened, and calculates the energization current command value for current to be flowed through the secondary side of the generator Gen from the power converter INV to make an amplitude value of the stator voltage of the generator Gen be coincident with an amplitude value of the network voltage.

The three-phase to two-phase coordinate converter 32dqtrs calculates, from the input current value Ir and rotor phase THr, the d-axis current detection value Idr (energization current components) and q-axis current detection value Iqr (torque current components) by using an equation (7), and outputs the d-axis current detection value Idr to a current adjustor 4-ACR and the q-axis current detection value Iqr to a current adjustor 3-ACR.

$$\begin{pmatrix} Idr \\ Iqr \end{pmatrix} = \frac{2}{3} \begin{pmatrix} \cos(THr) & \sin(THr) \\ -\sin(THr) & \cos(THr) \end{pmatrix} \quad (7)$$

$$\begin{pmatrix} Iu \cdot \cos(0) + Iv \cdot \cos(2\pi/3) + Iw \cdot \cos(4\pi/3) \\ Iu \cdot \sin(0) + Iv \cdot \sin(2\pi/3) + Iw \cdot \sin(4\pi/3) \end{pmatrix}$$

The current adjustor 4-ACR adjusts an output d-axis voltage command value Vdr so as to make zero a difference between the d-axis current command value $Id_1$ or $Id_0$ and the d-axis current detection value Idr. Similarly, the current adjustor 3-ACR adjusts an output q-axis voltage command value Vqr so as to make zero a difference between the q-axis current command value $Iq_1$ or $Iq_0$ and the q-axis current detection value Iqr. For example, the current adjustors 3-ACR and 4-ACR may be constituted of a proportional integrator.

The d-axis voltage command value Vdr and q-axis voltage command value Vqr are input to the two-phase to three-phase coordinate converter dq23trs, and the two-phase to three-phase coordinate converter dq23trs calculates the voltage command values Vur, Vvr and Vwr from the phase signal THr and the input command values by using equations (8) and (9), and outputs the calculated values to a PWM calculator PWMr.

$$\begin{pmatrix} Va \\ Vb \end{pmatrix} = \begin{pmatrix} \cos(THr) & -\sin(THr) \\ \sin(THr) & \cos(THr) \end{pmatrix} \begin{pmatrix} Vdr \\ Vqr \end{pmatrix} \quad (8)$$

-continued $$\begin{pmatrix} Vur \\ Vvr \\ Vwr \end{pmatrix} = \begin{pmatrix} \cos(0) & \sin(0) \\ \cos(2\pi/3) & \sin(2\pi/3) \\ \cos(4\pi/3) & \sin(4\pi/3) \end{pmatrix} \begin{pmatrix} V\alpha \\ V\beta \end{pmatrix} \quad (9)$$

The PWM calculator PWMr calculates, from the input voltage command values Vur, Vvr and Vwr, a gate signal Pulse_inv for turning on and off m power semiconductor elements constituting the power converter INV by a pulse width modulation (PWM) method, and outputs the gate signal to the power converter INV.

Next, a synchronization controller SYNC will be described with reference to FIG. 3. The synchronization controller SYNC shown in FIG. 3 receives $V\alpha$ and $V\beta$ obtained through three-phase to two-phase conversion of the network voltage Vs and the stator voltage Vg of the generator Gen corresponding to one phase, i.e., in FIG. 3 the U-phase voltage Vgu. The synchronization controller SYNC has mainly two functions. One function calculates a voltage command value so as to coincide the amplitude of the stator voltage Vg with the amplitude of the network voltage, and the other function calculates a phase correction value LTH so as to coincide the phase of the stator voltage Vg with the phase of the network voltage. The synchronization controller SYNC shown in FIG. 3 operates to make first the voltage amplitude values be coincident and then adjust the voltage phases.

In order to synchronize the voltage amplitudes, an amplitude value Vspk of the network voltage is calculated from a root square sum of $V\alpha$ and $V\beta$, ripple components of the calculated amplitude value Vspk are removed by using a first-order lag filter FIL or the like, and the resultant amplitude value is used as the voltage command value Vsref of the voltage adjustor AVR. In this embodiment, only one phase of the stator voltage Vg is detected. Therefore, in order to obtain the amplitude value of the U-phase voltage Vgu, for example, a maximum value during one period of a network frequency (50 or 60 Hz) is used as the amplitude value. This amplitude value is used as the feedback value Vgpk of the voltage adjustor AVR and is also used for an amplitude synchronization judging unit CMPPK, The amplitude synchronization judging unit CMPPK compares the network voltage amplitude value Vgpk with the voltage command value Vsref, and if a difference therebetween is in a predetermined range, e.g., if the amplitude value Vgpk is 90% to 110% of the voltage command value Vsref, or preferably 95% to 105%, an amplitude synchronization flag FLG_VG is set to "1", whereas in other cases, "0" is output.

A phase synchronization function of the synchronization controller SYNC operates while the amplitude synchronization flag FLG_VG is "1", i.e., while the voltage command value Vsref is generally equal to the network voltage amplitude value Vgpk. Since the $\alpha$ item $V\alpha$ of the network voltage is coincide with the U-phase of the system voltage, a difference between $V\alpha$ and the phase of the U-phase voltage Vgu of the stator voltage is used to make zero the difference.

Assuming that the network voltage amplitude value Vgpk is coincident with the amplitude of the stator voltage, an absolute value calculator abs calculates an absolute value ABSDV of the difference by using an equation (10).

$$ABSDV = V\alpha - Vgu \quad (10)$$
$$= Vgpk \times \sin(\omega_0 \cdot t) - Vgpk \times \sin(\omega_1 \cdot t + dTH)$$

where $\omega_0$ is an angular frequency of the network voltage, $\omega_1$ is an angular frequency of a stator voltage, dTH is a phase difference and t is a time.

The energization phase THr corresponds to a value obtained by subtracting a rotation phase TH from the network voltage phase THs. Therefore, if the rotation phase TH is obtained correctly, if the energization phase THr is calculated correctly and if the power converter INV energizes at the energization phase THr, then the stator angular frequency $\omega_1$ becomes nearly equal to the network voltage angular frequency $\omega_0$. If the voltage amplitudes are equal, the equation (10) can be rewritten as an equation (11).

$$ABSDV = Vgpk \times \sin(dTH) \text{(After voltage amplitudes coincidence)} \quad (11)$$

An angle converter detects the maximum value of the equation (11) during one period of the network frequency, divides the maximum value by the amplitude value Vgpk of the network voltage to normalize it, and calculates a phase difference calculation value DTH by an equation (12) to output it.

$$DTH = ABSDV/Vgpk = \sin(dTH) \text{(After voltage amplitudes coincidence)} \quad (12)$$

If the phase difference dTH is small, the equation (12) can be approximated to an equation (13).

$$DTH \approx dTH \quad (13)$$

Although DTH has a small error if the voltage amplitudes are equal, DTH has an error if the voltage amplitudes are not equal. Therefore, in order to retain synchronization even if there is an error, a sign of the U-phase voltage Vgu of the stator voltage when the $\alpha$ item $V\alpha$ becomes zero cross is judged and a multiplier 202 multiplies DTH by the sign. An output of the multiplier 202 is the phase difference. If this phase difference is output as the phase correction value LTH, the phase of the stator voltage of the generator changes abruptly. Therefore, the phase difference detection value DTH is passed through a limiter and an integrator 201 to be output as the phase correction value LTH. Namely, an input is first limited by the limiter LMT and this limited value is integrated by the integrator 201 so that an abrupt change in the stator voltage phase can be prevented. An integrated value when synchronization succeeds can be used as an initial value for the second and subsequent operations.

Figure 2:
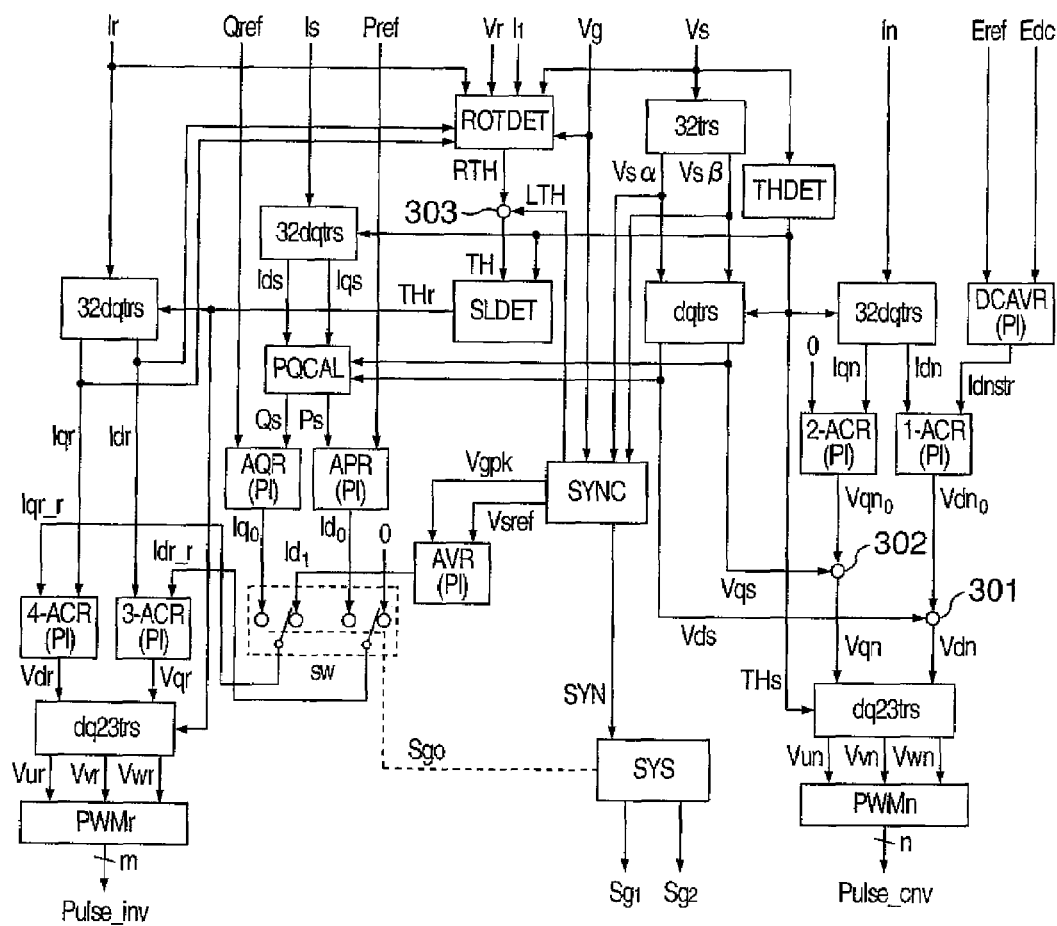
FIG. 2 is a control block diagram of a control apparatus CTRL according to the first embodiment of the present invention.
Figure 3:
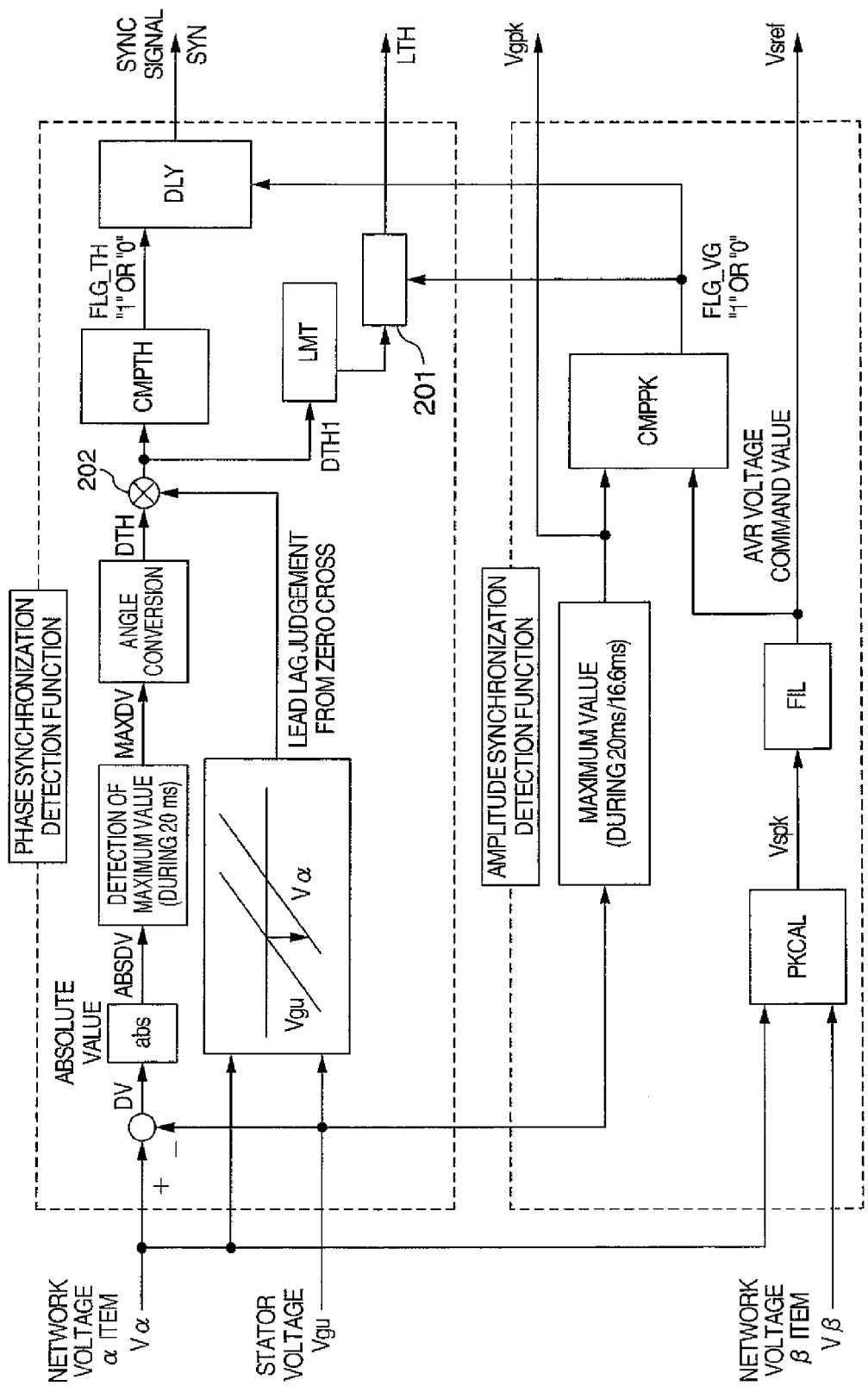
FIG. 3 is a control block diagram of a synchronous controller SYNC according to the first embodiment of the present invention.

In FIG. 3, if the detected phase difference correction value is in a predetermined range around 0, e.g., in a range from +5° to −5°, a phase synchronization judgement unit CMPTH sets FLG_TH to "1" and in other cases, outputs "0". A time delay adder DLY sends a sync signal SYN to the system controller SYS shown in FIG. 2, after "1" of the output FLG_TH of the phase synchronization judgement unit CMPTH continues consecutively during a predetermined time. Upon reception of the sync signal SYN, the system controller SYS outputs the signals $Sg_0$ and $Sg_1$ for operating the switch SW and electromagnetic contact switch $CTT_1$.

Figure 4:
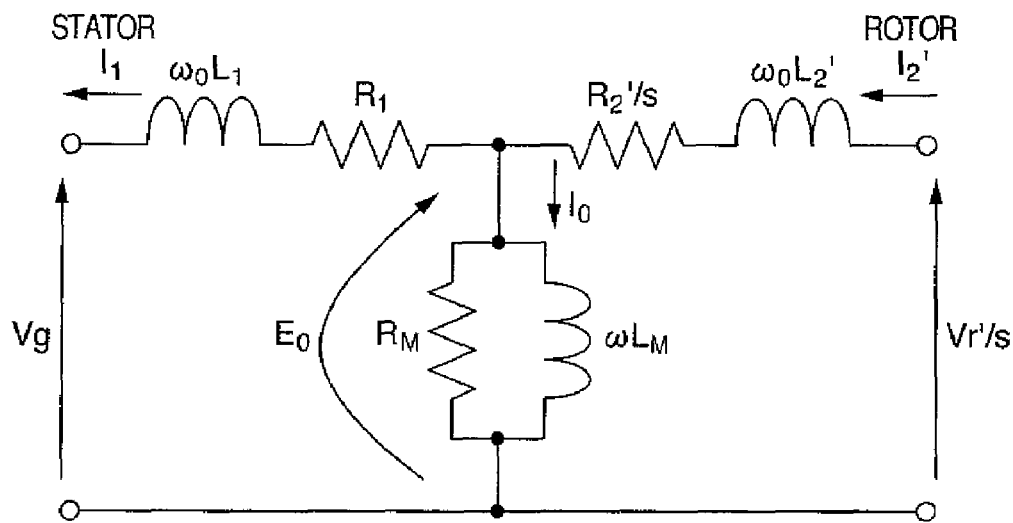
FIG. 4 is an illustrative diagram showing an equivalent circuit of an AC energization synchronous generator.

With reference to FIGS. 4 to 7, detailed description will be made on the rotation phase detector ROTDET shown in FIG. 2. In FIGS. 4 to 7, like components to those shown in FIG. 1 are represented by the identical reference symbols. FIG. 4 is an equivalent circuit of the AC energization synchronous generator Gen. The voltage equations of this equivalent circuit are given by equations (14) and (15), and the relation given by an equation (16) exists among an electrical frequency $\omega_r$ of the generator, a network voltage frequency $\omega_0$ and a slip s of the generator.

$$\dot{V}g = -(R_1 + j\omega_0 L_1)\dot{I}_1 + \dot{E}_0 \qquad (14)$$

$$\dot{E}_0 = \frac{\dot{V}'r}{s} - \left(\frac{R'_2}{s} + j\omega_0 L'_2\right)\dot{i}'_r \qquad (15)$$

$$s = \frac{\omega_0 - \omega_r}{\omega_0} \qquad (16)$$

In FIG. 4 and the equations (14) and (15), a symbol with an upper "•" indicates a vector, and a symbol with an upper "'" indicates a value converted to the primary side. $L_1$ represents a primary side leak inductance, $R_1$ represents a primary resistance, $L_2$ represents a secondary side leak inductance, $R_2$ represents a secondary resistance, RM represents a no-load loss resistance, LM represents an energization inductance, $E_0$ represents an induction electro motive force, $I_0$ represents an energization current, $\omega_0$ represents an output frequency, and $\omega_s(=\omega_0 \times s)$ represents a slip frequency. By obtaining the slip frequency $\omega_s$, a rotor position can be estimated. An equation (17) can be obtained by eliminating the induction voltage $E_0$ from the equations (14) and (15).

$$\dot{V}g = -(R_1 + j\omega_0 L_1)\dot{i}_1 + \frac{\dot{V}'r}{s} - \left(\frac{R'_2}{s} + j\omega_0 L'_2\right)\dot{i}'r \qquad (17)$$

By rearranging the equation (17), the slip s can be obtained from an equation (18).

$$s = \frac{\dot{V}'r - R'_2 \dot{i}'r}{\dot{V}g + (R_1 + j\omega_0 L_1)\dot{i}_1 + j\omega_0 L'_2 \dot{i}'_r} \qquad (18)$$

If the vector (real axis component and imaginary axis component) of the denominator of the equation (18) is equal to the vector (real axis component and imaginary axis component) of the numerator, the slip can be obtained. Therefore, the slip frequency $\omega_s$ can be calculated always without a rotor position sensor, by correcting the presently set slip frequency $\omega_s$ so as to make zero a phase difference between the denominator and numerator vectors. A frequency estimation calculation using the equation (18) is called hereinafter a voltage vector method.

Figure 5:
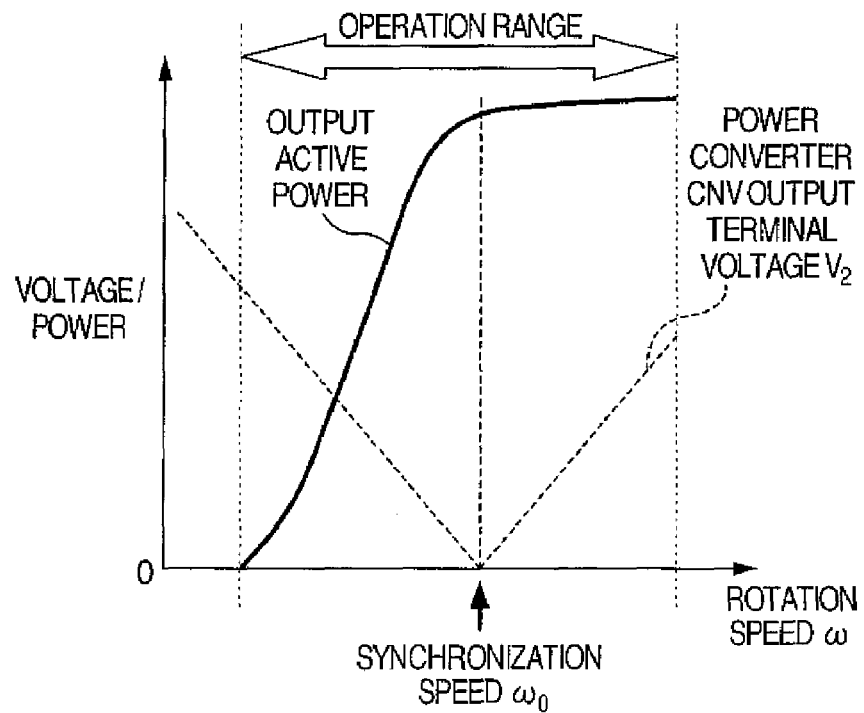
FIG. 5 is an illustrative diagram showing a rotor voltage and a stator power of an AC energization synchronous generator.

FIG. 5 is a graph whose abscissa represents a rotation speed and whose ordinate represents a voltage or an output power. In a secondary energization generator, at a synchronization frequency $\omega$ (slip s=0) with the coincident network frequency and rotation frequency, the secondary side voltage is controlled to be zero as shown in FIG. 5. Namely, the output terminal voltage $V_2$ of the power converter CNV is controlled to be nearly zero and the frequency is controlled to be zero. Therefore, a magnitude of the numerator vector of the equation (18) becomes small so that an estimated slip s is likely to have an error to be caused by errors of generator constants and the like, and the control is difficult to be performed correctly. There is therefore an area where the phase estimation using the vectors of the equation (18) is impossible. In such a case, a phase error estimation is performed using the secondary active and reactive currents and the primary power.

The primary active current $I_1 d$ and secondary active current are components of an active power. A primary side converted value Idr' of the secondary active current is coincident with the primary active current $I_1 d$. This is expressed by an equation (19).

$$Idr' = I_1 d \qquad (19)$$

The primary reactive current $I_1 q$ and secondary reactive current are components of a reactive power. A primary side converted value Iqr2' of the secondary reactive current Iqr' removing the energization current $I_0$, i.e., the secondary reactive current corresponding to the reactive power to be output to the stator side, is coincident with the primary reactive current $I_1 q2$. This is expressed by an equation (20).

$$Iqr_2 = Iqr' - I_0 = I_1 q \qquad (20)$$

The stator current $I_1$ may be calculated by the Kichhoff's law from the output current Ir of the power converter CNV and the network current Is. The energization current $I_0$ is one of the electric characteristics and can be obtained from the specifications or the like. The primary (stator) active current $Id_1$ is proportional to the stator active power P, and the primary (stator) reactive current $Iq_1$ is proportional to the stator reactive power Q, so that an equation (21) can stand.

$$P \propto I_1 d = Idr'$$

$$Q \propto I_1 q = Iqr_2' \qquad (21)$$

Therefore, the directions of the vectors representative of P and Q are coincident with the directions of the vectors representative of Idr' and Iqr$_2$'. If the estimated stator frequency value has an error, the rotation phase for coordinate conversion to obtain secondary d-axis and q-axis components has an error $\Delta\phi$ and the equation (21) cannot stand. Namely, if the estimated rotor phase value has a lead by $\Delta\phi$ from the actual phase, an equation (22) stands.

$$P \propto I_1 d = Idr' \cos(\Delta\phi) + Iqr_2' \sin(\Delta\phi)(\neq Idr')$$

$$Q \propto I_1 q = Iqr_2' \cos(\Delta\phi) + Idr' \sin(\Delta\phi)(\neq Iqr_2') \qquad (22)$$

Therefore, it is sufficient if the estimated rotation frequency value or estimated energization frequency value is corrected in such a manner that the vectors representative of P and Q shown in the equation (22) are coincide with the vectors representative of Idr' and Iqr$_2$', i.e., the relation of the equation (21) is satisfied. A slip frequency estimation calculation using the equations (21) and (22) is called hereinafter a power vector method. This power vector method is likely to have an error because if the primary power is small, the power vector becomes small. Therefore, the operation area is covered by using both the power vector method and the method using the voltage vector by the equation (18) using the generator constants.

Figure 6:
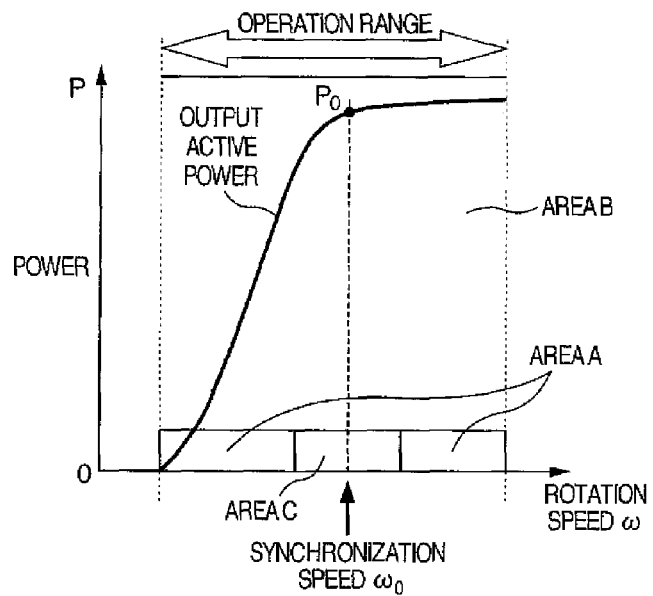
FIG. 6 is an illustrative diagram showing areas for which an energization control method is switched according to the first embodiment of the present invention.

FIG. 6 shows operation areas of the voltage vector method and power vector method. For example, in the state that the generator stator operates in combination with the network, the generator rotation frequency is estimated by the voltage vector method using the equation (18) in an area A shown in FIG. 6 where an output power is small, i.e., an area where an active output power $P_0$ at the synchronization speed $\omega_0$ of 10% or smaller, preferably 5% or smaller and the rotation speed is 75% or smaller than the synchronization speed $\omega_0$ and 125% or larger than the synchronization speed $\omega_0$, preferably 90% or smaller than the synchronization speed $\omega_0$ and 110% or larger than the synchronization speed $\omega_0$. In an area B where an output power is large, the power vector method using the equations (21) and (22) is adopted. In an area C where the output power is small near at the synchronization speed, activation and halt by reducing an output are avoided. With these operation methods, it is possible to estimate the generator rotation frequency and rotor position and perform a generation operation stably, in the state that the generator stator operates in combination with the network.

Figure 7:
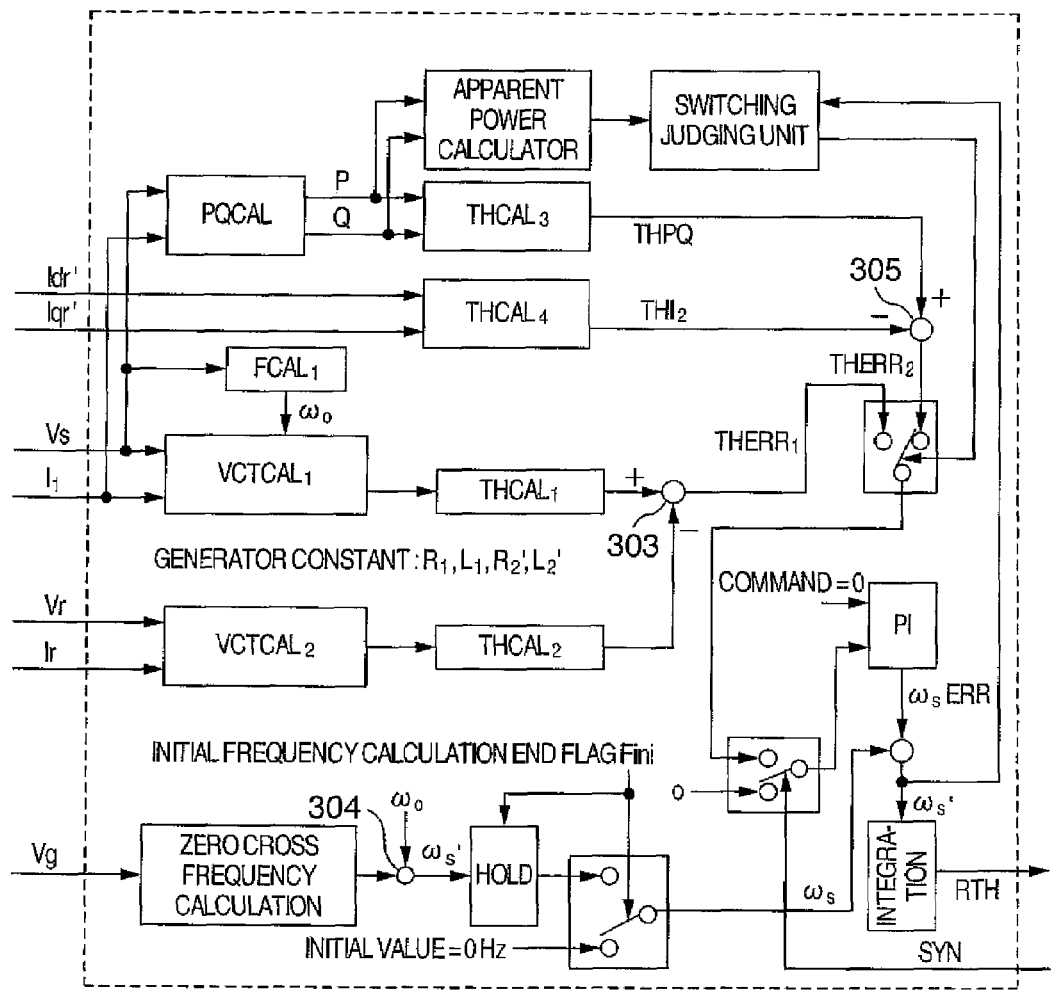
FIG. 7 is an illustrative diagram showing a rotation phase detector ROTDET according to the first embodiment of the present invention.

FIG. 7 shows the structure of the rotation phase detector ROTTED realizing the voltage vector method using the equation (18) and the power vector method using the equations (21) and (22). The slip s can be estimated by inputting the power network voltage Vs, primary side current $I_1$, secondary side energization voltage Vr and secondary side current Ir, to the rotation phase detector ROTTED. Although the slip s is obtained by using the secondary side energization voltage Vr in the above description, the voltage command values Vur, Vvr and Vwr of the power converter INV may be used in place of the secondary side energization voltage Vr.

First, description will be made on a method of obtaining an estimated error through rotation position estimation by the voltage vector method using the equation (18). Referring to FIG. 7, a vector calculator $VCTCAL_1$ calculates the vector (real axis component and imaginary axis component) of the denominator of the equation (18), from the frequency $\omega_0$ of the network voltage Vs obtained by the frequency calculator $FCAL_1$ and the constants such as a generator resistance and inductance. A vector calculator $VCTCAL_2$ calculates the vector (real axis component and imaginary axis component) of the numerator of the equation (18). Angle calculators $THCAL_1$ and $THCAL_2$ calculate angles (the phase of each vector assuming that the real axis is 0°) of the vectors, and a subtractor 305 calculates an angle difference $THERR_1$.

Next, description will be made on a method of obtaining an estimated error through rotation position estimation by the power vector method using the equations (21) and (22). Referring to FIG. 7, a power calculator PQCAL calculates the active power P and reactive power Q from the network voltage Vs and primary side current $I_1$. A phase calculator $THCAL_3$ calculates a phase of the vector P+jQ of the active and reactive powers indicated by an equation (23) and outputs a power vector phase THPQ to a subtractor 305.

$$P+jQ \quad (23)$$

The phase of the vector indicated by an equation (24) of the active current component Idr' of the secondary current Ir converted to the primary side and the reactive current component Iqr' converted to the primary side and removing the energization current $I_0$, is calculated and a current vector phase $THI_2$ is output to the subtractor 305.

$$Idr'+j(Iqr'-I_0) \quad (24)$$

The subtractor 305 subtracts $THI_2$ from the phase THPQ to obtain an angle difference $THERR_2$. The phase error $THERR_1$ of the voltage vector and the phase error $THERR_2$ of the power vector are input to a switch SWTH. As described with reference to FIG. 6, the switch SWTH selects the phase error $THERR_2$ if the primary side power is large (area B), and selects the phase error $THERR_1$ if the primary side power is small (area A). The wind turbine controller WTCTRL controls timings and the like of power commands and operation halt in order not to allow the operation state to enter the area C (where operation is not halted if the rotation speed is in the area C).

Since a correct slip can be obtained it the angle difference $THERR_1$ or $THERR_2$ is set to zero, the angle error THERR is used as the feedback value of the proportional integration adjuster, and zero is set to the target value. In this manner, the proportional integration adjustor can output an error of the presently set slip frequency $\omega_s$. The adder 304 adds the error to the presently set slip frequency $\omega_s$. Since the slip frequency $\omega_s'$ output from the adder 304 is the corrected slip frequency, this slip frequency is integrated to obtain a phase signal RTH.

The phase signal RTH and an output phase signal LTH of the synchronization controller SYNC are added by the adder 303 shown in FIG. 2 to obtain a phase signal TH. The phase signal TH and phase signal THs are input to an energization phase calculator SLDET. The energization phase calculator SLDET adds the phase signals Th and THs and outputs a phase signal THr of the electrical angular frequency of the rotor.

Figure 8:
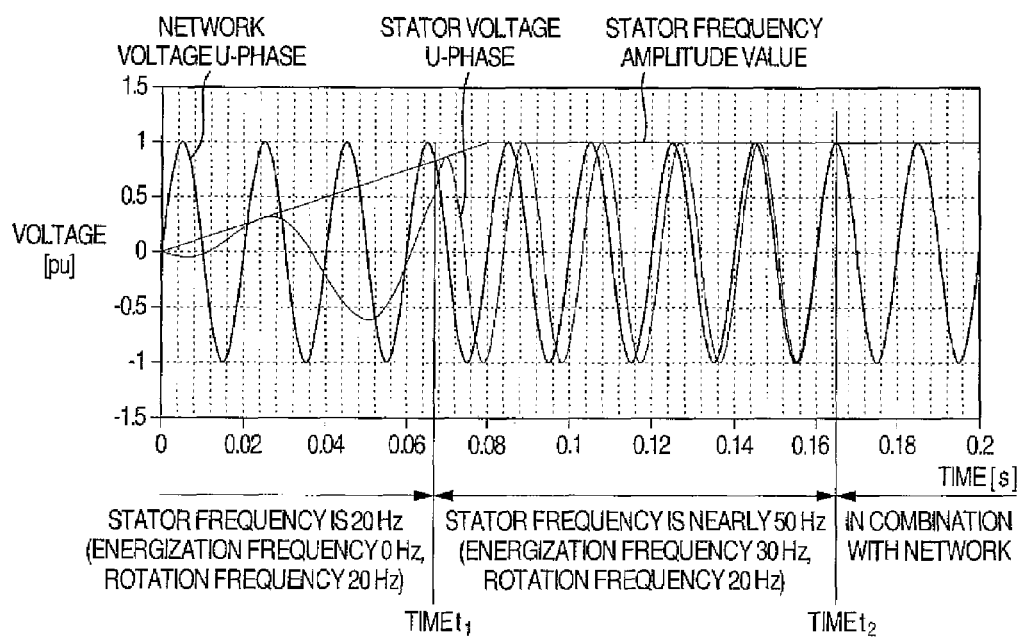
FIG. 8 is an illustrative diagram explaining an operation of voltage phase synchronization according to the first embodiment of the present invention.

FIG. 8 shows waveforms during an operation entering voltage synchronization shown in FIGS. 2 and 3. Referring to FIG. 8, the electromagnetic contact switch $CCT_1$ is opened and only the power converter CNV operates at an operation start time (before time t=0). Thereafter, during a period from time t=0 to time t=$t_2$, in order to perform a phase synchronization operation synchronizing the amplitude and phase of a network voltage, a power converter INV supplies a rotor with an energization current and the electromagnetic contact switch $CCT_1$ is closed at the time t=$t_2$ when the network voltage becomes generally coincident with a stator voltage, e.g., when the stator voltage reaches 90% to 110% of the network voltage, preferably 95% to 105%.

If an energization current is supplied at a fixed frequency, e.g., 0 Hz when the voltage phase synchronization starts, a rotation frequency appears on a stator voltage. Since a rotation speed can be known by detecting a frequency of zero crossing of the stator voltage, an energization frequency can be obtained to set the frequency of stator voltage to the same frequency of 50 Hz or 60 Hz as the network frequency.

As the power converter INV supplies the energization current at the obtained energization frequency, the stator voltage can be set to the same frequency as the network frequency, e.g., in a range of 95% to 105%. After the energization frequency is determined, the stator voltage can be synchronized with the network frequency because a phase synchronization detector adds a phase error ($DTH_1$ in FIG. 3) to the energization phase. Namely, a predetermined value optionally decided by the control apparatus is used as the initial energization frequency. Next, a rotation speed is obtained from the resultant observed frequency of the stator voltage to make the stator voltage frequency be coincident with the network frequency. These operations mainly divided into two stages are therefore performed. When the phase difference becomes generally zero and the synchronization judging flag SYN is output, the system controller SYS sends the control switching signal Sgo to the switch SW and outputs a close command to the electromagnetic contact switch $CTT_1$.

In this manner, if there is no rotor position sensor, a rotation speed cannot be known at the initial stage and a rotation speed at the energization start is observed to determine an initial energization frequency. Therefore, the energization starts by using an optional fixed value (in the embodiment, 0 Hz) as the energization frequency to start operation. In this manner, the initial rotation frequency can be detected without a rotor position sensor, and energization at the slip frequency is possible. Therefore, it is advantageous in that synchronous incorporation operation of the network is possible without a rotor position sensor.

The power generation apparatus can be operated stably by avoiding activation and power reduction halt in the area where an output power at a synchronization speed is small and the operation of a control apparatus whose AC energization synchronous generator does not have a rotor position sensor is difficult because of its characteristics. Even if a command is not issued for the area C where activation or operation halt is difficult, there is no problem of the system, particularly wind power generation whose rotation speed changes with wind.

Synchronous incorporation of a network has been described above. Conversely, if an AC energization synchronous generator is to be released from the network, the electromagnetic contact switch $CTT_1$ is opened and released (parallel off) while the AC energization synchronous generator operates at a rotation speed other than the synchronization frequency $\omega_0$, and thereafter, energization by the power converters INV and CNV is stopped.

Although wind power generation has been described in the embodiment, the present invention is applicable to generators of various applications such as hydraulic power generation, fly wheel power generation and engine power generation in addition to wind power generation, because the present invention can incorporate secondary excitation type generators/motors to a network.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A power generation apparatus comprising:
an AC energization synchronous generator;
a switching device for connecting to a network disposed on a stator side of said AC energization synchronous generator;
an energizing device for applying a variable frequency AC to a secondary winding of said AC energization synchronous generator;
a first voltage detection unit for detecting a voltage of said switching device on the stator side; and
a control unit for estimating a rotational frequency of said AC energization synchronous generator based on a frequency of a stator side voltage of said switching device, while said switching device is open.

2. A power generation apparatus according to claim 1, wherein said control unit adjusts the frequency of AC from said energizing device to control the frequency of a stator side voltage of said switching device.

3. A power generation apparatus according to claim 2, further comprising a second voltage detection unit for detecting a network side voltage of said switching device, wherein said control unit adjusts the frequency of AC from said energizing device to make the frequency of a stator side voltage of said switching device be coincident with a network side frequency of said switching device.

4. A method of generating electric power for a power generation apparatus, said power generation apparatus including:
an AC energization synchronous generator;
a switching device for connecting to a network disposed on a stator side of said AC energization synchronous generator;
an energizing device for applying a variable frequency AC to a secondary winding of said AC energization synchronous generator; and
a first voltage detection unit for detecting a voltage of said switching device on the stator side, wherein said method comprises the step of:
calculating a rotational frequency of said AC energization synchronous generator using information about a frequency of a stator side voltage of said switching device, while said switching device is open.

5. A method according to claim 4, further comprising the step of adjusting the frequency of AC from said energizing device to control the frequency of a stator side voltage of said switching device.

6. A method according to claim 5, wherein said power generation apparatus further includes a second voltage detection unit for detecting a network side voltage of said switching device, wherein said method further comprises the steps of:
adjusting the frequency of AC from said energizing device to make the frequency of a stator side voltage of said switching device be coincident with a network side frequency of said switching device; and
closing said switching device when the frequency of the stator side voltage of said switching device is coincident with the network side frequency of said switching device.

7. A wind power generation apparatus comprising:
an AC energization synchronous generator having a rotor connected to a wind turbine;
a switching device for connecting to a network disposed on a stator side of said AC energization synchronous generator;
an energizing device for applying a variable frequency AC to a secondary winding of said AC energization synchronous generator;
a first voltage detection unit for detecting a voltage of said switching device on the stator side; and
a control unit for estimating a rotational frequency of said AC energization synchronous generator based on a frequency of a stator side voltage of said switching device, while said switching device is open.

8. A wind power generation apparatus according to claim 7, wherein said control unit adjusts the frequency of AC from said energizing device to control the frequency of a stator side voltage of said switching device.

9. A wind power generation apparatus according to claim 8, further comprising a second voltage detection unit for detecting a network side voltage of said switching device, wherein said control unit adjusts the frequency of AC from said energizing device to make the frequency of a stator side voltage of said switching device to be coincident with a network side frequency of said switching device.

* * * * *